US012348926B2

(12) United States Patent
Wilson et al.

(10) Patent No.: US 12,348,926 B2
(45) Date of Patent: Jul. 1, 2025

(54) MULTI-MICROPHONE HEADSET

(71) Applicant: New Audio LLC, New York, NY (US)

(72) Inventors: Thomas C. Wilson, Brooklyn, NY (US); Clayton J. Pipkin, Highland Park, NJ (US); Marten Wallby, Malmo (SE); Zachary Hellman, New York, NY (US); Jonathan Levine, New York, NY (US)

(73) Assignee: New Audio LLC, New York, NY (US)

( * ) Notice: Subject to any disclaimer, the term of this patent is extended or adjusted under 35 U.S.C. 154(b) by 0 days.

(21) Appl. No.: 18/322,935

(22) Filed: May 24, 2023

(65) Prior Publication Data

US 2024/0147126 A1 May 2, 2024

Related U.S. Application Data

(63) Continuation of application No. 17/357,761, filed on Jun. 24, 2021, now Pat. No. 11,700,474.

(51) Int. Cl.
*H04R 1/10* (2006.01)

(52) U.S. Cl.
CPC ....... *H04R 1/1041* (2013.01); *H04R 2420/05* (2013.01); *H04R 2420/07* (2013.01)

(58) Field of Classification Search
CPC .................................................... H04R 1/1041
See application file for complete search history.

(56) References Cited

U.S. PATENT DOCUMENTS

| | | | |
|---|---|---|---|
| 1,127,161 | A | 2/1915 | Baldwin |
| 1,289,826 | A | 12/1918 | Lawton |
| 1,367,746 | A | 2/1921 | Kent |
| 1,483,315 | A | 2/1924 | Saal |
| 1,489,978 | A | 4/1924 | Oscar |
| 1,555,997 | A | 10/1925 | Tiodolf |
| 1,587,409 | A | 6/1926 | Ouillette |
| 1,648,832 | A | 11/1927 | Ladislaus |
| 1,649,551 | A | 11/1927 | Smith |

(Continued)

FOREIGN PATENT DOCUMENTS

| | | |
|---|---|---|
| CN | 304974345 | 1/2019 |
| CN | 306794554 | 8/2021 |

(Continued)

OTHER PUBLICATIONS

"International Search Report and Written Opinion Issued in PCT Application No. PCT/US2022/034823", Mailed Date: Oct. 21, 2022, 9 Pages.

(Continued)

*Primary Examiner* — Simon King
(74) *Attorney, Agent, or Firm* — Holzer Patel Drennan

(57) ABSTRACT

An audio device includes one or more earcups, at least one of the earcups including a boom connector port, a connection detector connected to the boom connector port and configured to detect a connection state at the boom connector port, one or more first microphones positioned in the one or more earcups, audio processing circuitry, and a microphone switch controller connected to the connection detector and configured to connect audio processing circuitry to one of the one or more first microphones or the boom connector port based on the detected connection state of the boom connector port.

16 Claims, 10 Drawing Sheets

(56) References Cited

U.S. PATENT DOCUMENTS 1,651,623 A 12/1927 Obergfell
1,714,377 A 5/1929 George
1,717,377 A 6/1929 Forry
1,821,529 A 9/1931 Samuel
1,926,688 A 9/1933 Schaal
2,010,612 A 8/1935 Stafford
2,140,132 A 12/1938 Hollett
2,235,372 A 3/1941 Otto
2,373,172 A 4/1945 Sinkler
2,394,374 A 2/1946 Gilman
2,413,345 A 12/1946 Gilman
2,486,267 A 10/1949 Dulinsky
2,497,007 A 2/1950 Constantine
2,503,432 A 4/1950 Bowers
2,510,344 A 6/1950 Law
2,511,234 A 6/1950 Anderson
2,652,457 A 9/1953 Knowles
2,670,807 A 3/1954 Brown
2,747,191 A 5/1956 Hoffmaster
2,782,423 A 2/1957 Eli et al.
2,858,544 A 11/1958 Roth
2,924,290 A 2/1960 Zuerker
2,946,860 A 7/1960 Jansen et al.
3,053,944 A 9/1962 Weeks
3,073,410 A 1/1963 Gongoll et al.
3,119,904 A 1/1964 Anson
3,183,565 A 5/1965 Schwarz
3,272,926 A 9/1966 Falkenberg
3,440,663 A 4/1969 Beguin
3,445,597 A 5/1969 Walters
3,454,964 A 7/1969 Brinkhoff
3,488,457 A 1/1970 Lahti
3,505,684 A 4/1970 Hutchinson et al.
3,562,446 A 2/1971 Wolf
3,562,816 A 2/1971 Hutchinson
3,579,640 A 5/1971 Beguin et al.
3,593,341 A 7/1971 Aileo
3,797,045 A 3/1974 Aho
3,815,155 A 6/1974 Davison et al.
3,859,748 A 1/1975 Blue
3,908,200 A 9/1975 Lundin
3,922,725 A 12/1975 Csiki et al.
3,959,989 A 6/1976 Bhandia
3,984,885 A 10/1976 Yoshimura et al.
D244,037 S 4/1977 Warner et al.
D244,301 S 5/1977 Besasie
4,037,064 A 7/1977 Yasuda
D250,761 S 1/1979 Vong
4,173,715 A 11/1979 Gosman
4,175,217 A 11/1979 Williams
D254,183 S 2/1980 Doodson
D255,352 S 6/1980 Besasie
4,274,181 A 6/1981 Schaller
4,306,121 A 12/1981 Joscelyn et al.
4,309,575 A 1/1982 Zweig et al.
4,385,209 A 5/1983 Greason et al.
4,420,657 A 12/1983 Larkin et al.
4,424,881 A 1/1984 Hattori
4,437,538 A 3/1984 Ohlsson et al.
4,439,645 A 3/1984 Scalzo
D274,516 S 7/1984 Walker
4,472,607 A 9/1984 Houng
4,538,034 A 8/1985 French
4,624,816 A 11/1986 Kurita et al.
D287,849 S 1/1987 Preisler et al.
D291,198 S 8/1987 Bellini
4,689,822 A 8/1987 Houng
4,727,585 A 2/1988 Flygstad
4,747,145 A 5/1988 Wiegel
4,796,307 A 1/1989 Vantine
4,829,571 A 5/1989 Kakiuchi et al.
D315,561 S 3/1991 Miller
D317,767 S 6/1991 Banks
5,035,005 A 7/1991 Hung
D328,074 S 7/1992 Yamazaki et al.
D337,116 S 7/1993 Hattori
5,233,650 A 8/1993 Chan
D345,163 S 3/1994 Yamatogi
5,293,647 A 3/1994 Mirmilshteyn et al.
5,333,206 A 7/1994 Koss
D358,391 S 5/1995 Sono
5,438,626 A 8/1995 Neuman et al.
5,457,751 A 10/1995 Such
D364,617 S 11/1995 Fitzgerald
5,499,985 A 3/1996 Hein et al.
5,551,090 A 9/1996 Thompson
D386,181 S 11/1997 Fisher
5,697,386 A 12/1997 Chang
D390,282 S 2/1998 Burdick
5,729,615 A 3/1998 Yang
5,822,798 A 10/1998 Baxley
D402,318 S 12/1998 Dunipace
D402,659 S 12/1998 Suzuki
5,862,241 A 1/1999 Nelson
D410,466 S 6/1999 Mouri
D413,550 S 9/1999 Otterson et al.
5,951,141 A 9/1999 Bradley
D415,763 S 10/1999 Petchonka
D420,356 S 2/2000 Suzuki
D422,206 S 4/2000 Clark
D423,012 S 4/2000 Yasutomi
D424,150 S 5/2000 Post
D425,888 S 5/2000 Fitzgerald
6,081,604 A 6/2000 Hikichi et al.
D431,550 S 10/2000 Yoneda
D432,522 S 10/2000 Kieltyka et al.
D435,249 S 12/2000 Yasutomi
6,201,877 B1 3/2001 Chang
D441,734 S 5/2001 Fitzgerald
6,263,085 B1 7/2001 Weffer
D453,015 S 1/2002 Yuyama
D456,379 S 4/2002 Fitzgerald
6,392,196 B1 5/2002 Lin
6,427,018 B1 7/2002 Keliiliki
D464,630 S 10/2002 Woodworth
6,611,963 B2 9/2003 Woo et al.
6,625,293 B1 9/2003 Nageno et al.
D484,485 S 12/2003 Matsuoka
6,654,966 B2 12/2003 Rolla
D488,146 S 4/2004 Minto
D491,917 S 6/2004 Asai
D504,414 S 4/2005 Yoshida
D508,483 S 8/2005 Suzuki
D512,708 S 12/2005 Harris et al.
6,980,165 B2 12/2005 Yuasa et al.
D514,087 S 1/2006 Wilson et al.
D517,527 S 3/2006 Suzuki
D518,474 S 4/2006 Suzuki
7,106,873 B1 9/2006 Harrison et al.
7,146,004 B2 12/2006 Bodley et al.
7,172,052 B2 2/2007 Lenhard-Backhaus
D538,261 S 3/2007 Taylor et al.
7,251,335 B1 7/2007 Chen
D560,654 S 1/2008 Feng
D567,215 S 4/2008 Lee
7,388,960 B2 6/2008 Kuo et al.
7,391,878 B2 6/2008 Liao
D573,581 S 7/2008 Gondo et al.
D576,604 S 9/2008 Suzuki
7,457,649 B1 11/2008 Wilson
D588,098 S 3/2009 Kurihara
D592,640 S 5/2009 Tkachuk
D600,673 S 9/2009 Kim et al.
D600,674 S 9/2009 Brennwald
7,639,478 B2 12/2009 Wu et al.
D613,266 S 4/2010 Barry et al.
D617,781 S 6/2010 Kallas et al.
D620,474 S 7/2010 Komiyama
D633,367 S 3/2011 Scherr
D633,895 S 3/2011 Morimoto
D634,732 S 3/2011 Kondo et al.
D635,958 S 4/2011 Ando et al.
D637,176 S 5/2011 Brunner et al.
D639,776 S 6/2011 Arimoto

(56) References Cited

U.S. PATENT DOCUMENTS

| | | | |
|---|---|---|---|
| D641,725 | S | 7/2011 | Chong et al. |
| D642,554 | S | 8/2011 | Schaal et al. |
| D646,666 | S | 10/2011 | Maeyama |
| D652,021 | S | 1/2012 | Miyawaki |
| D652,022 | S | 1/2012 | Miyawaki |
| D652,406 | S | 1/2012 | Lee et al. |
| 8,094,859 | B2 | 1/2012 | Suematsu et al. |
| 8,098,872 | B2 | 1/2012 | Chang |
| D657,344 | S | 4/2012 | Brunner et al. |
| D657,776 | S | 4/2012 | Lee et al. |
| D660,823 | S | 5/2012 | Hardi et al. |
| D660,824 | S | 5/2012 | Hardi et al. |
| D662,080 | S | 6/2012 | Carr et al. |
| D662,490 | S | 6/2012 | Mcsweyn |
| D663,716 | S | 7/2012 | Hardi et al. |
| D664,116 | S | 7/2012 | Hutchieson |
| D664,118 | S | 7/2012 | Tappeiner et al. |
| 8,213,644 | B2 | 7/2012 | Choi |
| D665,775 | S | 8/2012 | Katsumata |
| D666,579 | S | 9/2012 | Hou |
| D666,992 | S | 9/2012 | Lee et al. |
| D671,914 | S | 12/2012 | Lee et al. |
| D672,745 | S | 12/2012 | Abed et al. |
| 8,325,962 | B2 | 12/2012 | Ishida et al. |
| D673,519 | S | 1/2013 | Tan |
| D673,520 | S | 1/2013 | Tan |
| D677,243 | S | 3/2013 | Kitayama et al. |
| D677,647 | S | 3/2013 | Lee et al. |
| D680,999 | S | 4/2013 | Chan |
| D683,329 | S | 5/2013 | Hagelin |
| 8,437,481 | B2 | 5/2013 | Johnson |
| 8,447,370 | B2 | 5/2013 | Ueda et al. |
| D684,559 | S | 6/2013 | Groset et al. |
| D686,758 | S | 7/2013 | Metcalf |
| D689,843 | S | 9/2013 | Lee |
| D691,579 | S | 10/2013 | Lee et al. |
| D693,791 | S | 11/2013 | Troy |
| D695,263 | S | 12/2013 | Mogili |
| D696,644 | S | 12/2013 | Sejpka |
| D697,495 | S | 1/2014 | Lian |
| D705,750 | S | 5/2014 | Wu et al. |
| 8,737,668 | B1 | 5/2014 | Blair et al. |
| D706,241 | S | 6/2014 | Szymanski et al. |
| D706,244 | S | 6/2014 | Goransson |
| 8,755,555 | B2 | 6/2014 | Dougherty et al. |
| D708,162 | S | 7/2014 | Wenger et al. |
| 8,774,442 | B2 | 7/2014 | Huang |
| D712,872 | S | 9/2014 | Yuen |
| D716,762 | S | 11/2014 | Greve |
| D721,052 | S | 1/2015 | Carr et al. |
| D722,998 | S | 2/2015 | Sancho et al. |
| D723,511 | S | 3/2015 | Pedersen |
| D727,280 | S | 4/2015 | Levine |
| D727,281 | S | 4/2015 | Levine |
| D727,289 | S | 4/2015 | Czaniecki |
| D728,512 | S | 5/2015 | Nakagawa |
| D729,194 | S | 5/2015 | Boeckel et al. |
| D731,458 | S | 6/2015 | Goransson |
| D732,002 | S | 6/2015 | Goransson |
| D732,503 | S | 6/2015 | Brunner et al. |
| D733,090 | S | 6/2015 | Petersen |
| D733,092 | S | 6/2015 | Gan |
| D734,296 | S | 7/2015 | Paterson et al. |
| D736,174 | S | 8/2015 | Levine |
| D736,175 | S | 8/2015 | Levine |
| D736,185 | S | 8/2015 | Yaegashi et al. |
| 9,106,986 | B2 | 8/2015 | Shen et al. |
| D737,799 | S | 9/2015 | Carr et al. |
| D741,842 | S | 10/2015 | Levine |
| D745,214 | S | 12/2015 | Haas |
| D746,790 | S | 1/2016 | Strasberg et al. |
| 9,234,654 | B1 | 1/2016 | Wang |
| D759,626 | S | 6/2016 | Wagner |
| D762,190 | S | 7/2016 | Levine |
| D762,191 | S | 7/2016 | Levine |
| D765,055 | S | 8/2016 | Hsieh et al. |
| D768,110 | S | 10/2016 | Suzuki |
| D771,012 | S | 11/2016 | Wagner |
| D772,841 | S | 11/2016 | Levine |
| D780,155 | S | 2/2017 | Levine et al. |
| D781,265 | S | 3/2017 | Levine et al. |
| D781,814 | S | 3/2017 | Levine |
| D782,995 | S | 4/2017 | Matthews |
| D786,826 | S | 5/2017 | Esses |
| D789,327 | S | 6/2017 | Miyake et al. |
| D792,376 | S | 7/2017 | Morimoto et al. |
| D795,218 | S | 8/2017 | Ohmachi |
| 9,729,954 | B2 | 8/2017 | Levine et al. |
| D805,056 | S | 12/2017 | Levine |
| D808,359 | S | 1/2018 | Meyer et al. |
| D809,477 | S | 2/2018 | Brunner et al. |
| D809,478 | S | 2/2018 | Arimoto et al. |
| D810,055 | S | 2/2018 | Levine |
| D811,362 | S | 2/2018 | Petersen |
| D811,365 | S | 2/2018 | Czaniecki |
| D812,588 | S | 3/2018 | Levine |
| D813,194 | S | 3/2018 | Loh et al. |
| 9,917,940 | B2 | 3/2018 | Broadley et al. |
| D815,614 | S | 4/2018 | Tzeng et al. |
| 9,972,895 | B2 | 5/2018 | Hirsch et al. |
| D820,810 | S | 6/2018 | Levine et al. |
| D826,208 | S | 8/2018 | Czaniecki |
| D832,811 | S | 11/2018 | Levine et al. |
| D832,813 | S | 11/2018 | Levine et al. |
| D833,071 | S | 11/2018 | Pennington |
| D836,600 | S | 12/2018 | Lee et al. |
| D845,928 | S | 4/2019 | Lee et al. |
| D849,713 | S | 5/2019 | Hänggi et al. |
| D851,627 | S | 6/2019 | Ter Laag et al. |
| D852,166 | S | 6/2019 | Levine |
| 10,327,057 | B2 | 6/2019 | Levine et al. |
| D857,652 | S | 8/2019 | Wang |
| D857,654 | S | 8/2019 | Levine |
| D859,354 | S | 9/2019 | Xia |
| D864,898 | S | 10/2019 | Chen |
| D865,706 | S | 11/2019 | Li et al. |
| D868,029 | S | 11/2019 | Hänggi et al. |
| D868,731 | S | 12/2019 | Jung |
| D878,329 | S | 3/2020 | Levine et al. |
| D879,067 | S | 3/2020 | Hu |
| D879,742 | S | 3/2020 | Hu |
| D882,544 | S | 4/2020 | Paterson et al. |
| 10,659,874 | B2 | 5/2020 | Johnson et al. |
| D888,010 | S | 6/2020 | Lindenberger |
| 10,674,245 | B2 | 6/2020 | Chih-Hsueh et al. |
| D890,123 | S | 7/2020 | Yoshimura |
| D893,453 | S | 8/2020 | Levine et al. |
| 10,743,106 | B2 | 8/2020 | Daley et al. |
| 10,757,499 | B1 | 8/2020 | Vautrin et al. |
| 2001/0036291 | A1 | 11/2001 | Pallai |
| 2003/0210801 | A1 | 11/2003 | Naksen et al. |
| 2004/0216946 | A1 | 11/2004 | Lenhard-Backhaus |
| 2004/0229658 | A1* | 11/2004 | Kim .................... H04M 1/6066 455/569.1 |
| 2005/0053255 | A1 | 3/2005 | Harris et al. |
| 2005/0105755 | A1 | 5/2005 | Yueh |
| 2005/0238189 | A1 | 10/2005 | Tsai |
| 2005/0266875 | A1 | 12/2005 | Yegin et al. |
| 2006/0062417 | A1* | 3/2006 | Tachikawa ........... H04R 1/1066 381/370 |
| 2006/0256992 | A1 | 11/2006 | Liao |
| 2007/0223766 | A1 | 9/2007 | Davis et al. |
| 2008/0056525 | A1 | 3/2008 | Fujiwara et al. |
| 2008/0167092 | A1* | 7/2008 | Ueda ................... H04M 1/6066 455/575.2 |
| 2008/0175406 | A1 | 7/2008 | Smith |
| 2009/0003616 | A1 | 1/2009 | Kleinschmidt et al. |
| 2009/0227298 | A1* | 9/2009 | Fukunaga ........... H04M 1/0258 381/384 |
| 2010/0177907 | A1 | 7/2010 | Morisawa |
| 2010/0260361 | A1* | 10/2010 | Yamkovoy ........... H04R 1/1083 381/309 |
| 2012/0070027 | A1 | 3/2012 | Ridler |
| 2012/0070028 | A1 | 3/2012 | Margulies |

(56) References Cited

U.S. PATENT DOCUMENTS

| | | | |
|---|---|---|---|
| 2012/0093334 | A1 | 4/2012 | Schreuder et al. |
| 2012/0125360 | A1 | 5/2012 | Hill et al. |
| 2012/0134503 | A1* | 5/2012 | Poulsen ............... H04R 29/004 381/58 |
| 2012/0266909 | A1 | 10/2012 | Tsai |
| 2014/0056459 | A1 | 2/2014 | Oishi et al. |
| 2014/0105414 | A1 | 4/2014 | Rois et al. |
| 2014/0153766 | A1 | 6/2014 | Huang |
| 2014/0307868 | A1 | 10/2014 | Weis |
| 2016/0079660 | A1 | 3/2016 | Bevelacqua |
| 2016/0080853 | A1 | 3/2016 | Chen |
| 2016/0205461 | A1 | 7/2016 | Fernandez-Medina et al. |
| 2016/0255435 | A1* | 9/2016 | Johnson ............ H04M 1/72409 381/74 |
| 2017/0041696 | A1 | 2/2017 | Levine et al. |
| 2017/0041697 | A1 | 2/2017 | Levine et al. |
| 2017/0113033 | A1 | 4/2017 | Wingeier et al. |
| 2017/0134845 | A1 | 5/2017 | Milam et al. |
| 2017/0201821 | A1 | 7/2017 | Mcauliffe et al. |
| 2017/0257692 | A1 | 9/2017 | Yang et al. |
| 2017/0265420 | A1 | 9/2017 | Carlson |
| 2017/0295420 | A1 | 10/2017 | Yeung et al. |
| 2017/0339479 | A1 | 11/2017 | Levine |
| 2017/0353781 | A1 | 12/2017 | Choi et al. |
| 2018/0020277 | A1 | 1/2018 | Briggs |
| 2018/0020278 | A1 | 1/2018 | Levine et al. |
| 2018/0227658 | A1 | 8/2018 | Hviid et al. |
| 2020/0014997 | A1* | 1/2020 | Ohno ..................... H04R 27/00 |
| 2021/0267300 | A1* | 9/2021 | Blomqvist ............... H04R 1/08 |
| 2022/0406285 | A1 | 12/2022 | Neves et al. |

FOREIGN PATENT DOCUMENTS

| | | |
|---|---|---|
| CN | 306885647 | 10/2021 |
| JP | 2013078014 A | 4/2013 |
| JP | 2015026948 A | 2/2015 |
| JP | D1666731 | 8/2020 |
| KR | 1020170001125 A | 1/2017 |

OTHER PUBLICATIONS

"Restriction Requirement Issued in U.S. Appl. No. 29/796,516", Mailed Date: Jan. 24, 2023, 11 Pages.

* cited by examiner

MULTI-MICROPHONE HEADSET

CROSS-REFERENCE TO RELATED APPLICATIONS

The present application is a continuation of U.S. patent application Ser. No. 17/357,761, filed on Jun. 24, 2021, and entitled "Multi-microphone Headset", the entirety of which is hereby incorporated by reference.

BACKGROUND

Audio equipment can provide sound output (e.g., via one or more speakers) and/or sound input (e.g., via one or more microphones). For example, a video gaming headset may include speakers positioned in earcups to provide sound output and a boom microphone (positioned at the end of a boom that extends from one of the earcups to a position near a user's mouth) to provide sound input. However, while the placement of a boom-mounted microphone (a "boom microphone") can provide excellent voice quality during operation, the boom can be awkward, "in the way," and unnecessary in many use cases (e.g., when the user is simply listening to music or does not require the quality provided by boom microphone.

SUMMARY

The foregoing problem is solved by an audio device including one or more earcups, at least one of the earcups including a boom connector port, a connection detector connected to the boom connector port and configured to detect a connection state at the boom connector port, one or more first microphones positioned in the one or more earcups, audio processing circuitry, and a microphone switch controller connected to the connection detector and configured to connect audio processing circuitry to one of the one or more first microphones or the boom connector port based on the detected connection state of the boom connector port.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
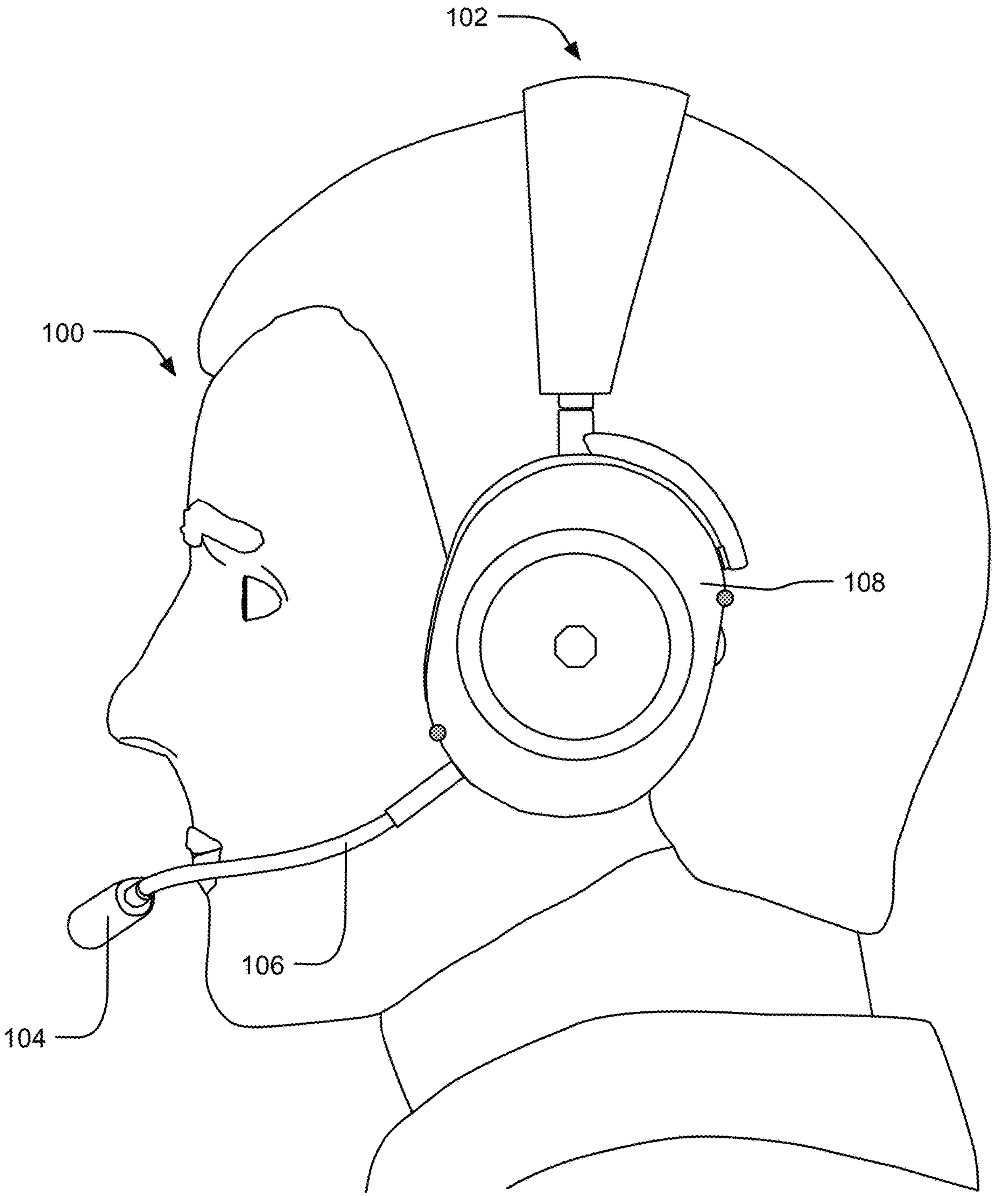
FIG. 1 illustrates a user wearing an example multi-microphone headset with a connected boom microphone.

FIG. 1 illustrates a user 100 wearing an example multi-microphone headset 102 with a connected boom microphone 104. In one implementation, the example multi-microphone headset 102 includes low-latency wireless gaming headphones that wirelessly connect to a gaming console or other wireless computing or communications device. Other implementations may include videoconferencing headphones and other headphones providing sound input and output capabilities.

The boom microphone 104 is electrically connected and attached by a boom 106 to a boom connector port (not shown) in an earcup 108 of the multi-microphone headset 102. The boom 106 provides structural support to position the boom microphone 104 in the proximity of the user's mouth and electrical connection to provide power and signal communications with circuitry in the earcup 108.

When the boom microphone 104 is electrically connected to the earcup 108, sound input is transferred to the multi-microphone headset 102 from the boom microphone 104. The boom 106 can be electrically disconnected and detached from the earcup 108, at which point circuitry in the earcup 108 detects the disconnection and/or the detachment and automatically switches sound input from the boom microphone 104 to beam-forming microphones (not shown) on the exterior of the earcup 108. It should be understood that automatic switching between microphones in response to detection of changes in a state of connection and/or attachment need not be limited to boom microphones and beam-forming microphones, as these are mere examples.

Figure 2:
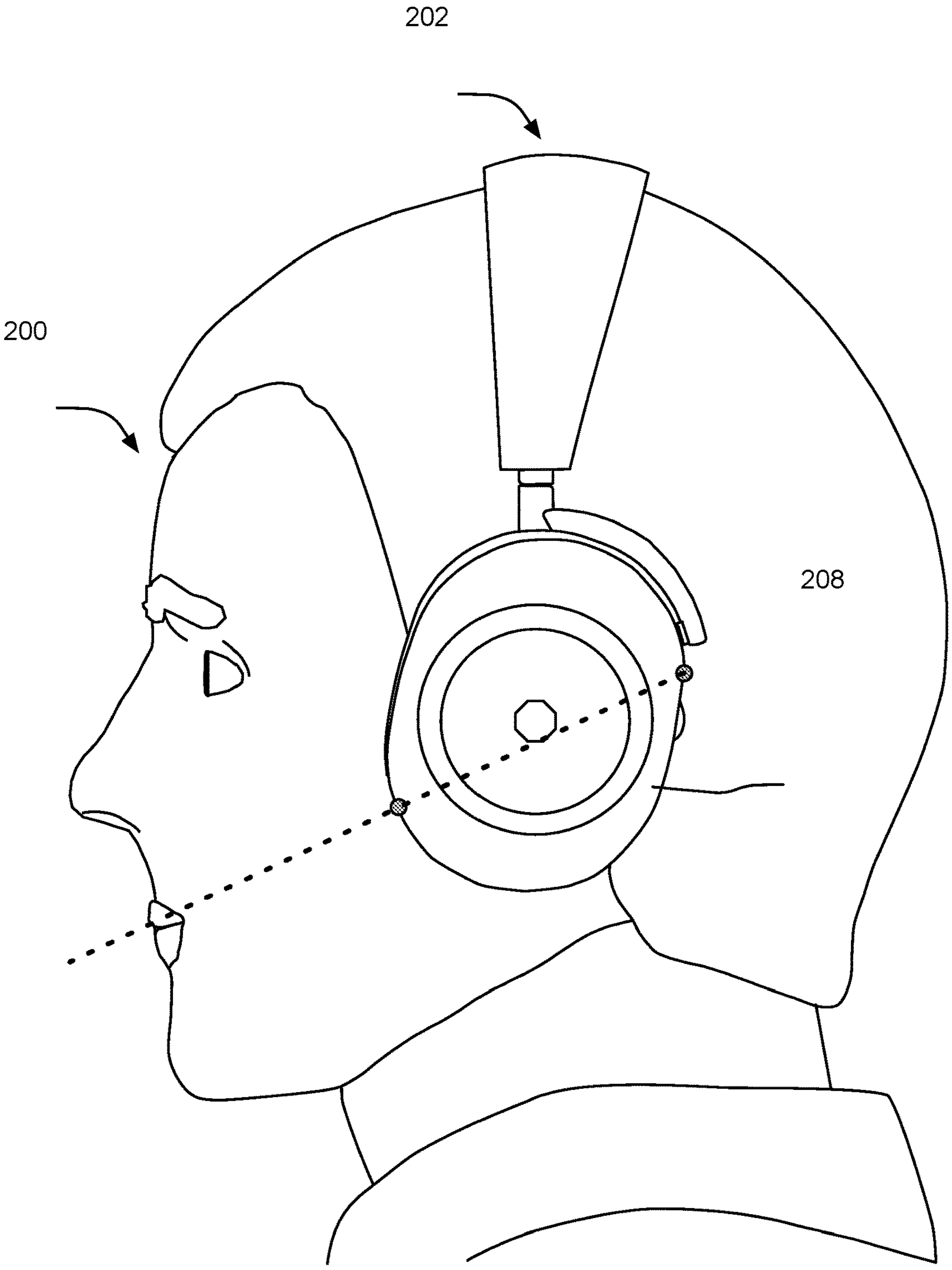
FIG. 2 illustrates a user wearing an example multi-microphone headset without a connected boom microphone.

FIG. 2 illustrates a user 200 wearing an example multi-microphone headset 202 without a connected boom microphone (not shown). The example multi-microphone headset 202 is similar to the example multi-microphone headset 102 of FIG. 1, but the boom microphone has been electrically disconnected and detached from an earcup 208. Accordingly, as discussed with respect to FIG. 1, the electrical disconnection and/or detachment of the boom microphone from the earcup 208 is detected by circuitry in the earcup 208, which automatically switches sound input from the boom microphone to beam forming microphones in the earcup 208 (not shown, but their positions are indicated by solid dots and the direction of the beam is shown by the dashed line 210, although another positioning may be employed). If the boom microphone is re-connected and attached to the earcup 208, the circuitry will detect it and automatically switch the sound input to the boom microphone.

Figure 3:
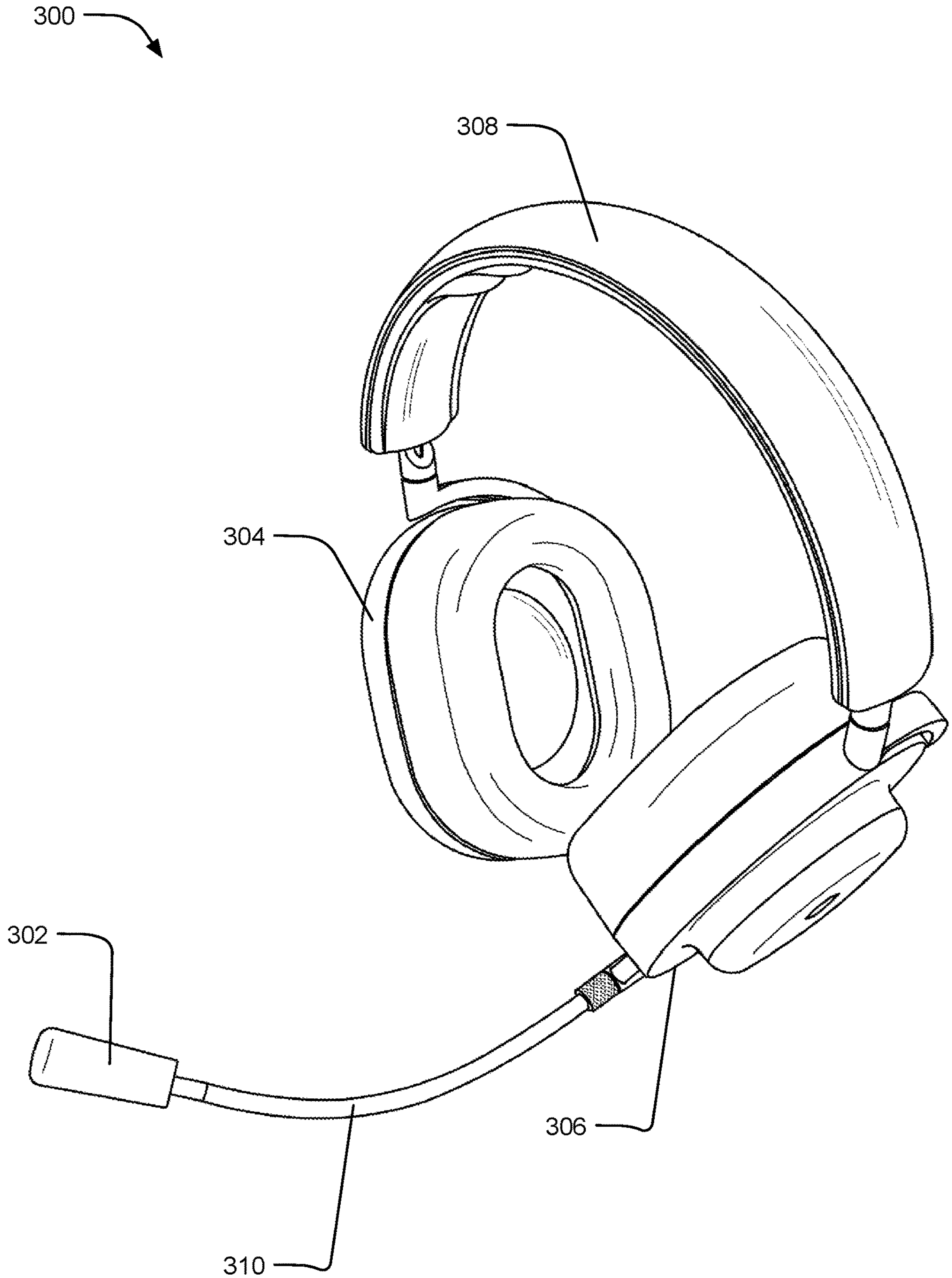
FIG. 3 illustrates a perspective view of an example multi-microphone headset with a connected boom microphone.

FIG. 3 illustrates a perspective view of an example multi-microphone headset 300 with a connected boom microphone 302. In one implementation, the example multi-microphone headset 300 are low-latency wireless gaming headphones that wirelessly connect to a gaming console or other wireless computing or communications device. Other implementations may include videoconferencing headphones and other headphones providing sound input and output capabilities.

Earcups 304 and 306 include speakers for sound output and are connected by an adjustable headband 308, which can electrically connect power and communication signals between the earcups 304 and 306. Accordingly, although circuitry for the automatic detection and switching of microphones is primarily described herein as being positioned within the earcup 306, the circuitry and ports for controlling and powering the multi-microphone headset 300 (including the detection and switching circuitry) can be distributed within one or both cups and/or the adjustable headband 308. One or both of the earcups 304 and 306 also include one or more microphones (not shown) as alternative sound inputs.

The boom microphone 302 is electrically connected and attached by a boom 310 to a boom connector port (not shown) in the earcup 306 of the multi-microphone headset 300. In one implementation, the boom 310 is connected to and attached to the boom connector port via a 2.5 mm jack, although other connections and/or attachments may be employed. The boom 310 provides structural support to position the boom microphone 302 in the proximity of the user's mouth and electrical connection to provide power and signal communications with the circuitry in the earcup 306. When the boom 310 is electrically connected and attached to the earcup 306, a connection detector in the circuitry detects the connection and/or attachment state, and a microphone switch controller configures the sound input to be received via the boom microphone 302. When the boom 310 is electrically disconnected and detached from the earcup 306, the connection detector in the circuitry detects the change in the connection and/or attachment state and the microphone switch controller in the circuitry configures the sound input to be received via the microphones in the earcup 306 or other microphones in the multi-microphone headset 300.

It should be understood that an example multi-microphone headset may have more than two microphones (e.g., more than one microphone in the boom and more than one microphone in the exterior of the earcup). Furthermore, an example multi-microphone headset may have additional microphones sets, such as one or more microphones positioned in the interior of the earcup to contribute to noise cancellation). Furthermore, in at least one implementation, the boom microphone 302 also includes a mute LED indicator (not shown) that is visible to the user when the user is wearing the multi-microphone headset 300 with the boom 310 connected.

Figure 4:
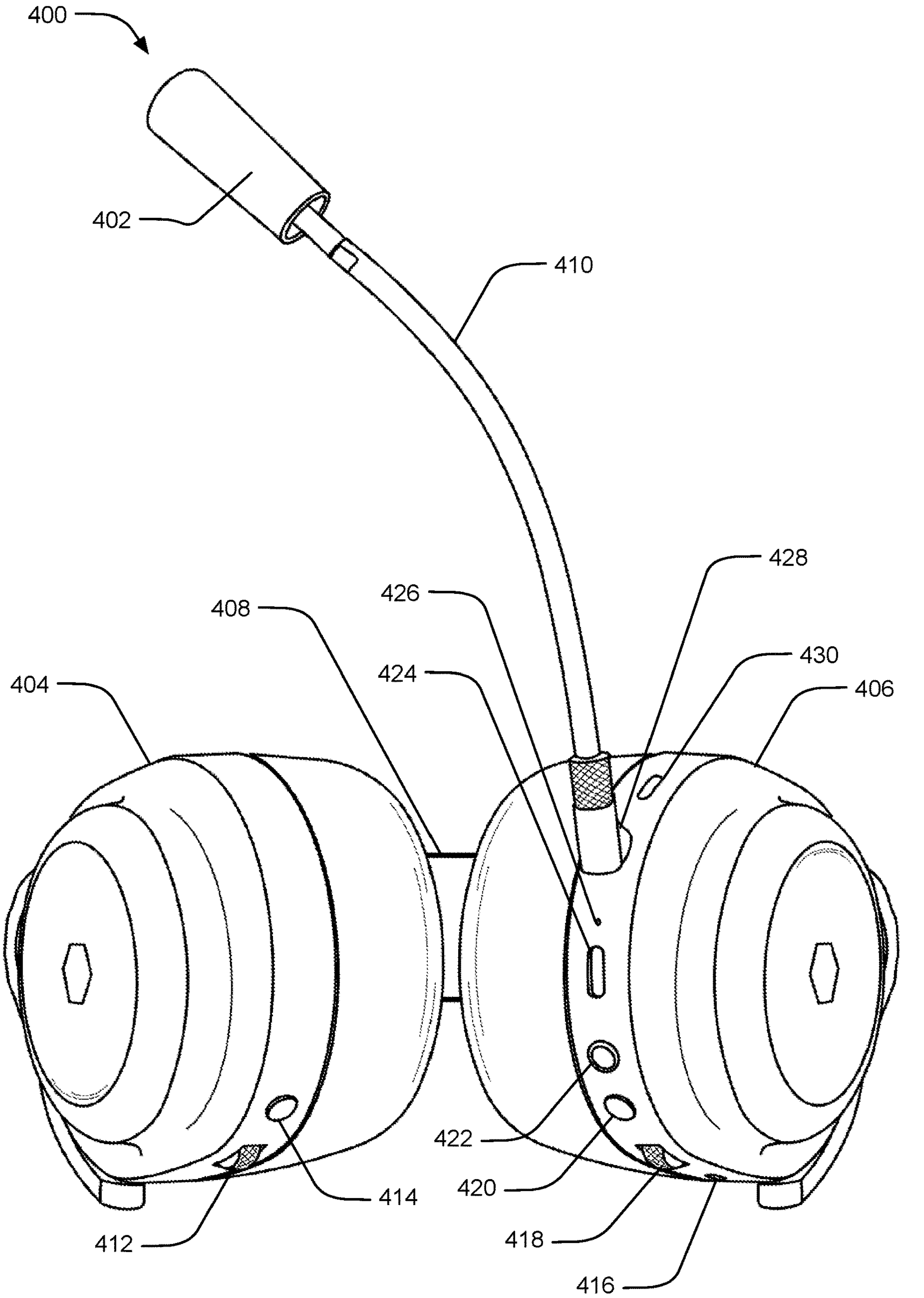
FIG. 4 illustrates a bottom view of an example multi-microphone headset with a connected boom microphone.

FIG. 4 illustrates a bottom view of an example multi-microphone headset 400 with a connected boom microphone 402. In one implementation, the example multi-microphone headset 400 are low-latency wireless gaming headphones that wirelessly connect to a gaming console or other wireless computing or communications device. Other implementations may include videoconferencing headphones and other headphones providing sound input and output capabilities.

Earcups 404 and 406 include speakers for sound output and are connected by an adjustable headband 408, which can electrically connect power and communication signals between the earcups 404 and 406. Accordingly, although circuitry for the automatic detection and switching of microphones is primarily described herein as being positioned within the earcup 406, the circuitry and ports for controlling and powering the multi-microphone headset 400 (including the detection and switching circuitry) can be distributed within one or both cups and/or the adjustable headband 408. One or both of the earcups 404 and 406 also include one or more microphones (not shown) as alternative sound inputs.

The boom microphone 402 is electrically connected and attached by a boom 410 to a boom connector port 428 in the earcup 406 of the multi-microphone headset 400. In one implementation, the boom 410 is connected to and attached to the boom connector port 428 via a 2.5 mm jack, although other connections and/or attachments may be employed. The boom 410 provides both structural support to position the boom microphone 402 in the proximity of the user's mouth and electrical connection, such as to provide power and signal communications with the circuitry in the earcup 406. When the boom 410 is electrically connected and attached to the earcup 406, a connection detector in the circuitry detects the connection and/or attachment state and a microphone switch controller configures the sound input to be received via the boom microphone 402. When the boom 410 is electrically disconnected and detached from the earcup 406, the connection detector in the circuitry detects the change in the connection and/or attachment state and the microphone switch controller in the circuitry configures the sound input to be received via the microphones in the earcup 406 or other microphones in the multi-microphone headset 400. Various controls and interfaces are positioned on the exterior of the earcups 404 and 406. In one implementation, a volume dial 412 and a multi-function button 414 are positioned on the exterior of the earcup 404, and the earcup 406 has the following items positioned on its exterior:

a microphone 416
a game chat volume 418 (with push-button mute)
a 7.1 surround sound button 420
a power button 422
a USB-C port 424
an LED indicator 426
the boom connector port 428
another microphone 430

In one implementation, the microphones 416 and 430 may be beam forming microphones. Additional microphones may be positioned within the interior of the earcups 404 and 406.

Figure 5:
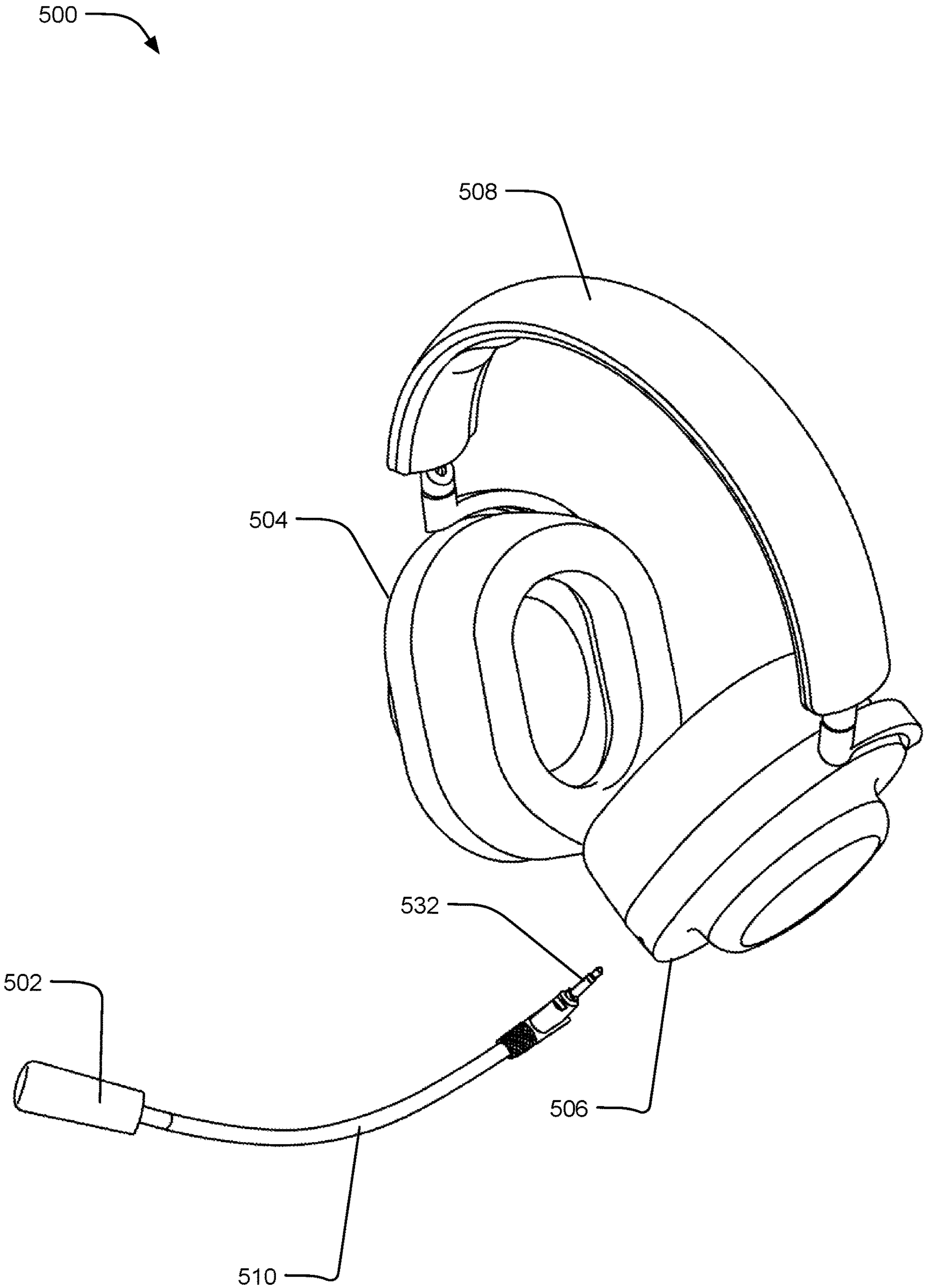
FIG. 5 illustrates a perspective view of an example multi-microphone headset without a connected boom microphone.

FIG. 5 illustrates a perspective view of an example multi-microphone headset 500 without a connected boom microphone 502. In one implementation, the example multi-microphone headset 500 are low-latency wireless gaming headphones that wirelessly connect to a gaming console or other wireless computing or communications device. Other implementations may include videoconferencing headphones and other headphones providing sound input and output capabilities.

Earcups 504 and 506 include speakers for sound output and are connected by an adjustable headband 508, which can electrically connect power and communication signals between the earcups 504 and 506. Accordingly, although circuitry for the automatic detection and switching of microphones is primarily described herein as being positioned within the earcup 506, the circuitry and ports for controlling and powering the multi-microphone headset 500 (including the detection and switching circuitry) can be distributed within one or both cups and/or the adjustable headband 508. One or both of the earcups 504 and 506 also include one or more microphones (not shown) as alternative sound inputs.

The boom microphone 502 is not electrically connected or attached by a boom 510 to a boom connector port (not shown) in the earcup 506 of the multi-microphone headset 500. In one implementation, the boom 510 includes a 2.5 mm jack 532, although other connections and/or attachments may be employed. However, in contrast to the boom 310 shown in FIG. 3, the boom 510 is shown in FIG. 5 as disconnected and unattached to the boom connector port, with the 2.5 mm jack 532 exposed. When connected, the boom 510 provides both structural support to position the boom microphone 502 in the proximity of the user's mouth and electrical connection, such as to provide power and signal communications with the circuitry in the earcup 506. Because the boom 510 is electrically disconnected and detached from the earcup 506, a connection detector in the circuitry detects the lack of connection and/or attachment, and a microphone switch controller configures the sound input to be received via the microphones in the earcup 506 or other microphones in the multi-microphone headset 500. If the user were to plug the 2.5 mm jack 532 into the boom connector port, the connection detector would detect the change in the connection/attachment state, and a microphone switch controller would switch sound input to the boom microphone 502.

It should be understood that an example multi-microphone headset may have more than two microphones (e.g., more than one microphone in the boom and more than one microphone in the exterior of the earcup). Furthermore, an example multi-microphone headset may have additional microphones sets, such as one or more microphones positioned in the interior of the earcup to contribute to noise cancellation).

Figure 6:
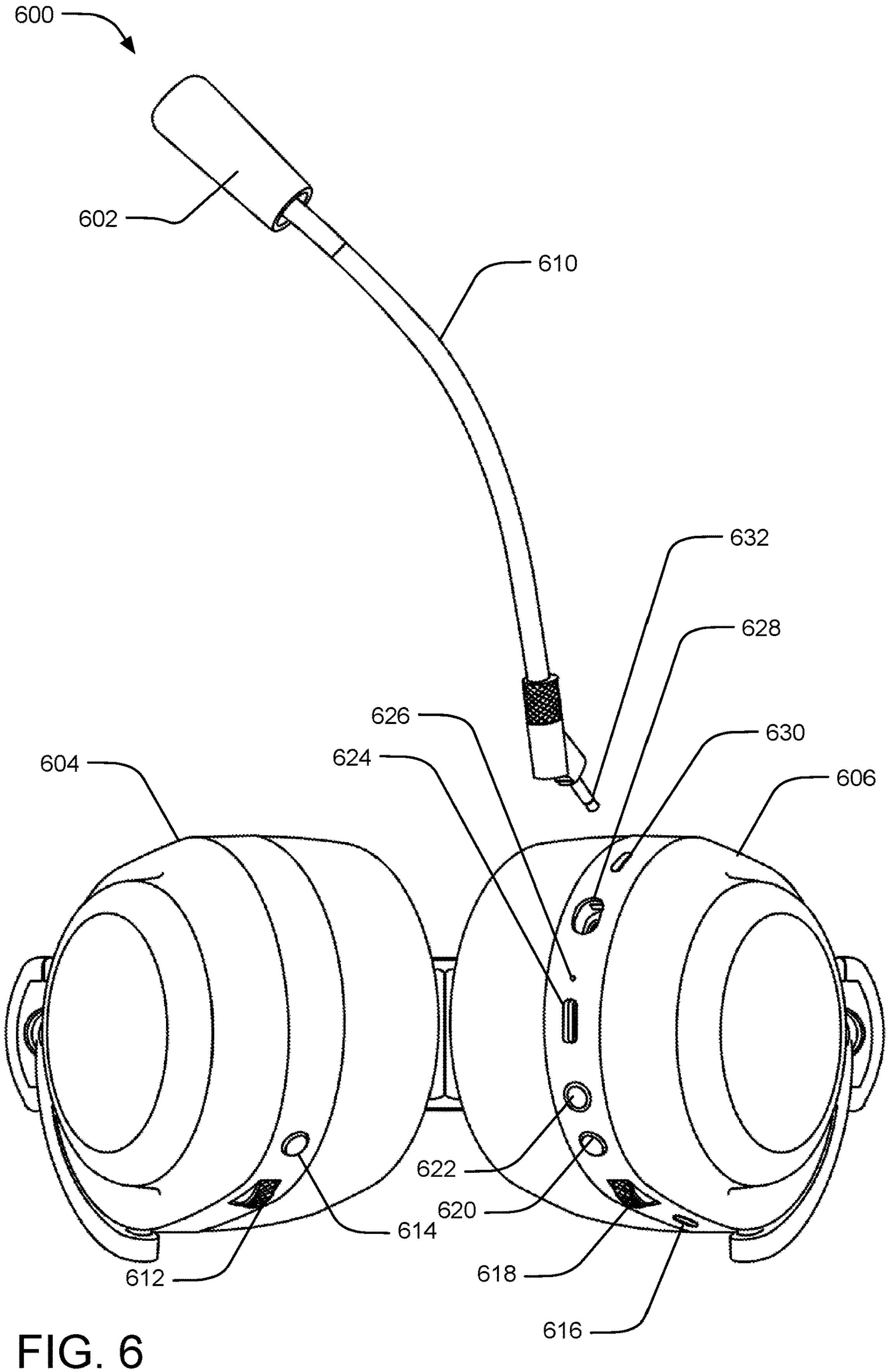
FIG. 6 illustrates a bottom view of an example multi-microphone headset without a connected boom microphone.

FIG. 6 illustrates a bottom view of an example multi-microphone headset 600 without a connected boom microphone. In one implementation, the example multi-microphone headset 600 are low-latency wireless gaming headphones that wirelessly connect to a gaming console or other wireless computing or communications device. Other implementations may include videoconferencing headphones and other headphones providing sound input and output capabilities.

Earcups 604 and 606 include speakers for sound output and are connected by an adjustable headband 608, which can electrically connect power and communication signals between the earcups 604 and 606. Accordingly, although circuitry for the automatic detection and switching of microphones is primarily described herein as being positioned within the earcup 606, the circuitry and ports for controlling and powering the multi-microphone headset 600 (including the detection and switching circuitry) can be distributed within one or both cups and/or the adjustable headband 608. One or both of the earcups 604 and 606 also include one or more microphones (not shown) as alternative sound inputs.

The boom microphone 602 is electrically connected and attached by a boom 610 to a boom connector port 628 in the earcup 606 of the multi-microphone headset 600. In one implementation, the boom 610 is connected to and attached to the boom connector port 628 via a 2.5 mm jack, although other connections and/or attachments may be employed. However, in contrast to the boom 410 shown in FIG. 4, the boom 610 is shown in FIG. 6 as disconnected and unattached to the boom connector port 628, with the 2.5 mm jack 632 exposed. When connected, the boom 610 provides both structural support to position the boom microphone 602 in the proximity of the user's mouth and electrical connection, such as to provide power and signal communications with the circuitry in the earcup 606. Because the boom 610 is electrically disconnected and detached from the earcup 606, a connection detector in the circuitry detects the lack of connection and/or attachment, and a microphone switch controller configures the sound input to be received via the microphones in the earcup 606 or other microphones in the multi-microphone headset 600. If the user were to plug the 2.5 mm jack 632 into the boom connector port, the connection detector would detect the change in the connection/attachment state, and a microphone switch controller would switch sound input to the boom microphone 602.

Various controls and interfaces are positioned on the exterior of the earcups 604 and 606. In one implementation, a volume dial 612 and a multi-function button 614 are positioned on the exterior of the earcup 604, and the earcup 606 has the following items positioned on its exterior:

- a microphone 616
- a game chat volume 618 (with push-button mute)
- a 7.1 surround sound button 620
- a power button 622
- a USB-C port 624
- an LED indicator 626
- the boom connector port 628 (e.g., a 2.5 mm jack)
- another microphone 630

In one implementation, the microphones 616 and 630 may be beam forming microphones. Additional microphones may be positioned within the interior of the earcups 604 and 606.

Figure 7:
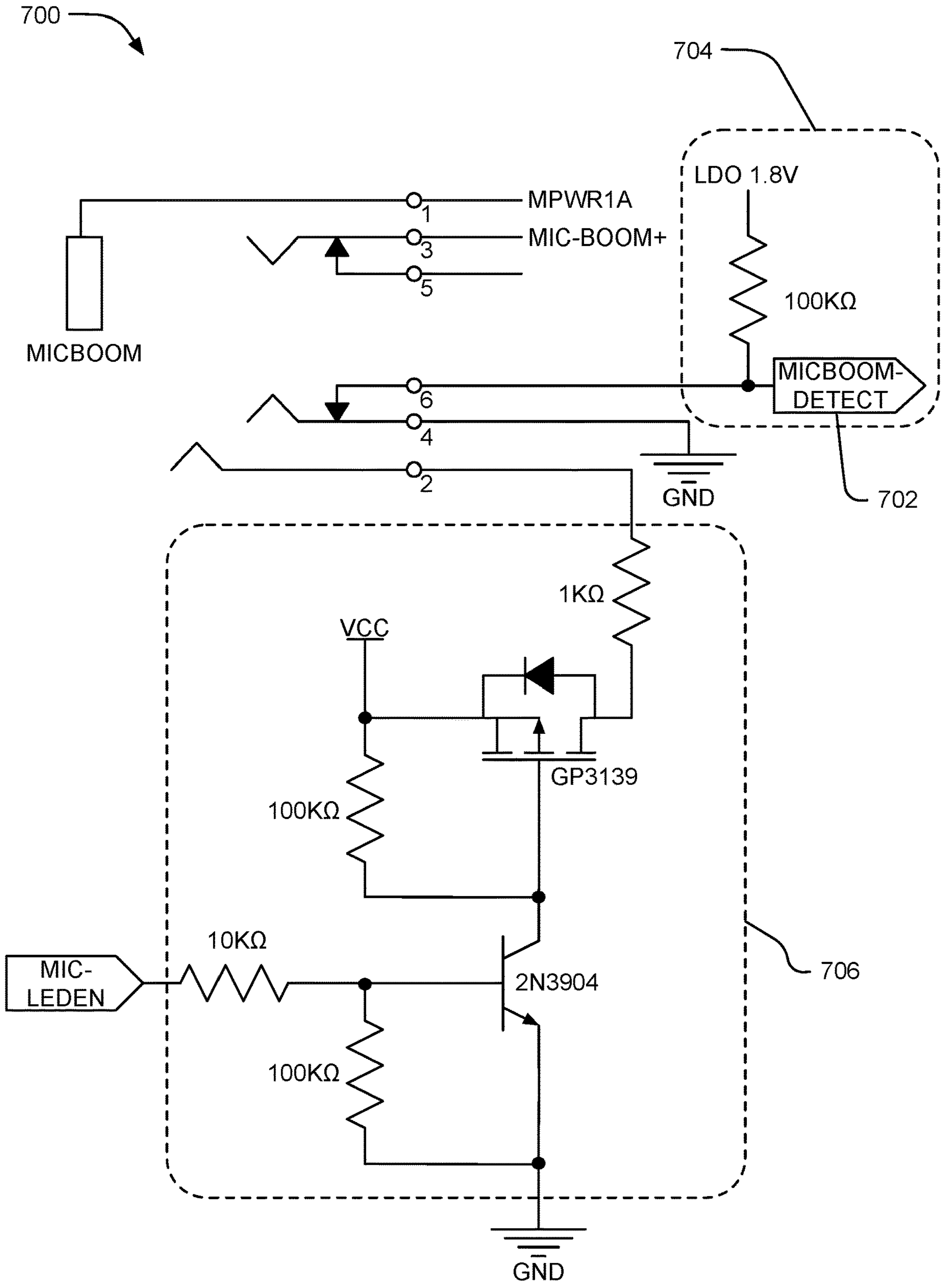
FIG. 7 illustrates an electrical schematic of an example microphone switching circuit.

FIG. 7 illustrates an electrical schematic of an example connection detector and microphone switching circuit 700. The MICBOOM-DET signal 702 in the connection detector 704 is at a low logic signal (e.g., low voltage) when the boom plug is not inserted into the boom connector port. When the boom plug is inserted into the boom connector port, then the connection between pin 6 and pin 4 of the 2.5 mm jack is opened, and the MICBOOM-DET signal 702 is pulled high to indicate the change in the connection state. The connection/attachment state can be saved as a parameter in the audio processing circuitry or microphone switch controller to effect the appropriate connection for sound input.

An example electrical detection mechanism is described with regard to FIG. 7. Alternatively, other detection mechanisms may be used, including without limitation a mechanical or magnetic switch that is triggered when the plug is inserted into the connector port. A change in connection state can be detected by such switches, and a signal or parameter is changed accordingly to switch between two sets of microphones in the headphones (e.g., boom microphone(s) or earcup microphone(s)).

Figure 8:
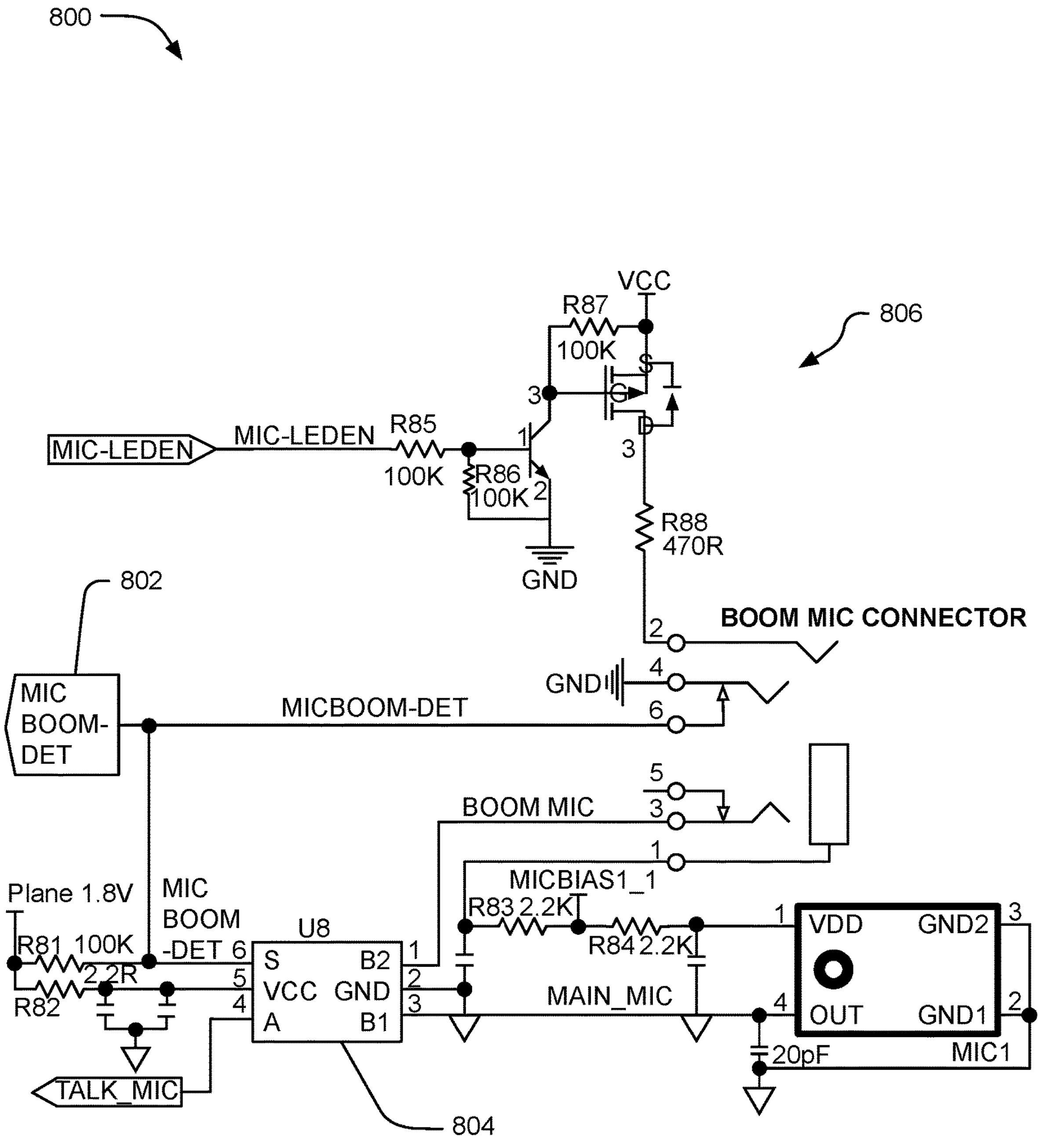
FIG. 8 illustrates an alternative electrical schematic of an example microphone switching circuit.

FIG. 8 illustrates an alternative electrical schematic of an example microphone switching circuit 800. In a manner similar to that of FIG. 7, the circuitry enables the appropriate microphone (e.g., the ear cup microphone, the boom microphone) based on the connection state of the boom. Depending on the connection state "MICBOOM-DET" signal, a microphone switch controller U8 (block 804) connects the sound input from either the earcup microphone ("MAIN_MIC") or the boom microphone ("BOOM_MIC") to the audio processing circuitry. A connection state (e.g., the "MICBOOM-DET" signal 802) may also be used to inform the audio processor which microphone is used as the active microphone (via signal "TALK_MIC") and configure the audio processing algorithm for electronic noise cancellation to match the selected microphones, which can often have different audio capabilities and characteristics. The "MICLEDEN" signal is used to control the LED on/off on the boom mic for mute state indication, as controlled by circuitry 806.

An example electrical detection mechanism is described with regard to FIG. 8. Alternatively, other detection mechanisms may be used, including without limitation a mechanical or magnetic switch that is triggered when the plug is inserted into the connector port. A change in connection state can be detected by such switches, and a signal or parameter is changed accordingly to switch between two sets of microphones in the headphones (e.g., boom microphone(s) or earcup microphone(s)).

Figure 9:
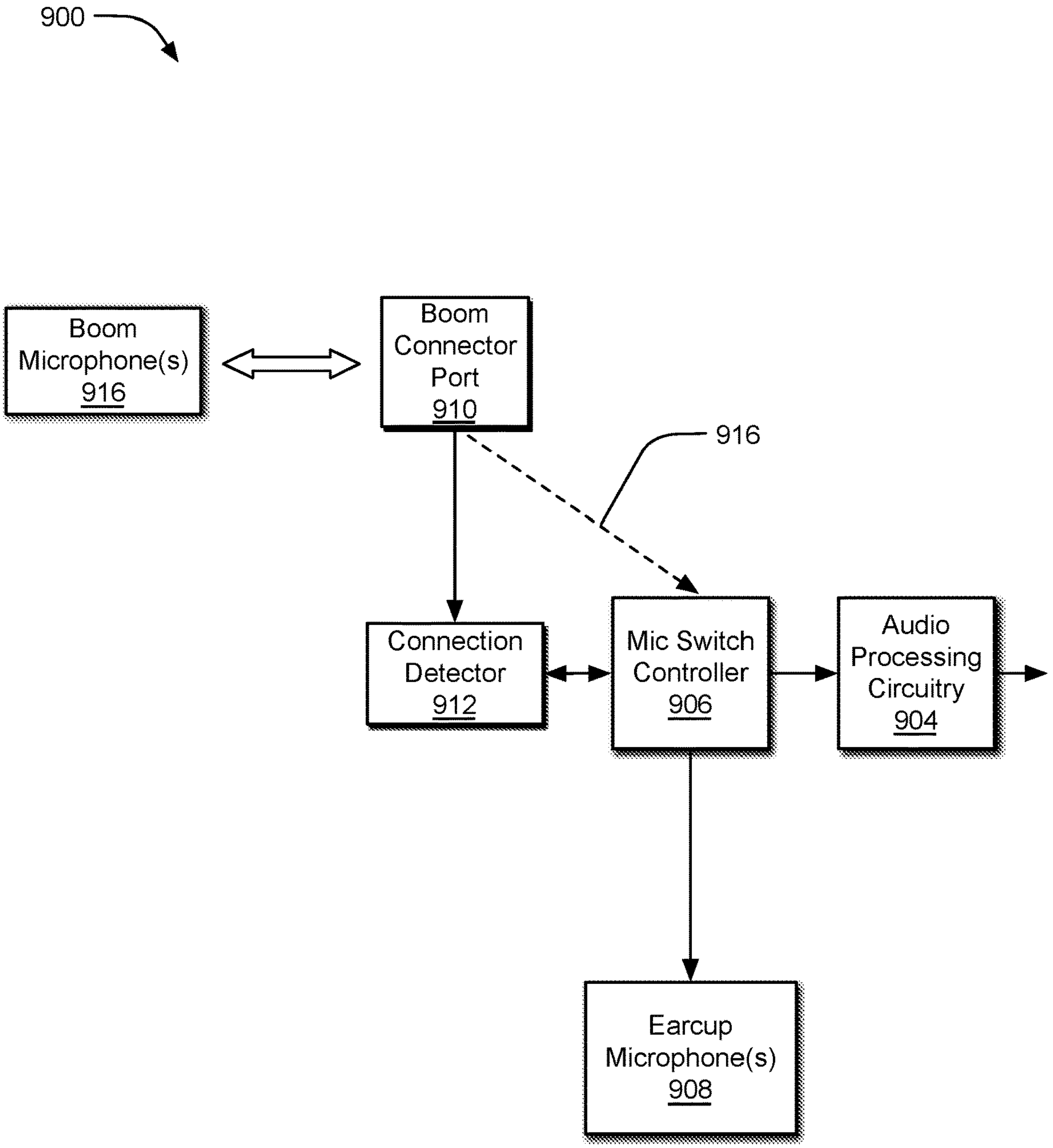
FIG. 9 illustrates a block diagram of an example microphone switching circuit.

FIG. 9 illustrates a block diagram of an example connection detector and microphone switching circuit 900. Audio processing circuitry 904 is configured to receive sound input from a microphone switch controller 906 and to provide audio processing functionality, such as noise cancellation, filtering, muting, communication to a wireless transceiver and/or other circuitry, etc. The microphone switch controller 906 is coupled to one or more earcup microphones 908 and a boom connector port 910 (through a connection detector 912 or via an alternative connection 914). The boom connector port 910 is configured to receive a boom connector plug (not shown) connected to one or more boom microphones 916. The boom connector plug can be removably connected/attached to the boom connector port 910 by a user.

The connection detector 912 can detect whether the one or more boom microphones 916 are connected to the boom connector port 910. For example, in one implementation, connection of a boom plug to the boom connector port 910 can open an electrical connection in the boom connector port 910 to raise a voltage level on the MICBOOM-DETECT signal, which indicates a state of a connected/attached boom microphone. A low voltage on the MICBOOM-DETECT signal indicates a state of a disconnected/unattached boom microphone. Other boom detection schemes may be employed.

When the connection detector 912 detects that the one or more boom microphones 916 are connected to the boom connector port 910, the microphone switch controller 906 directs sound input to the audio processing circuitry 904 from the boom connector port 910, rather than from the one or more earcup microphones 908. In contrast, when the connection detector 912 detects that the one or more boom microphones 916 are not connected to the boom connector port 910, the microphone switch controller 906 directs sound input to the audio processing circuitry 904 from the one or more earcup microphones 908, rather than from the boom connector port 910.

Figure 10:
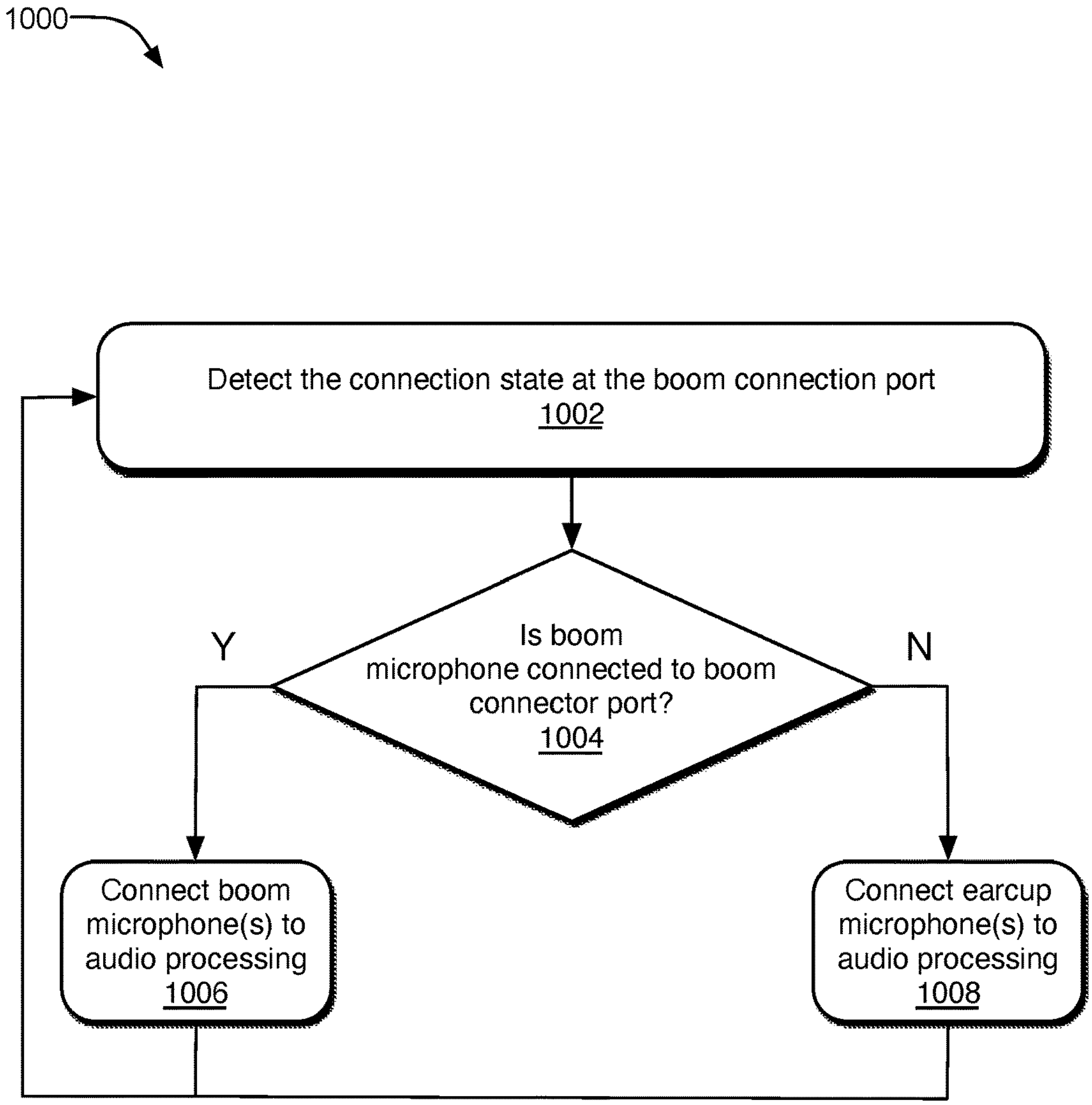
FIG. 10 illustrates a flow diagram of example operations for switching microphones in a multi-microphone headset.

FIG. 10 illustrates a flow diagram of example operations 1000 for switching microphones in a multi-microphone headset. A detection operation 1002 detects the connection state at the boom connection port. A decision operation 1004 determines whether the boom microphone (and/or the boom) are connected at the boom connection port. If so, a connection operation 1006 connects sound input from the boom microphone to the audio processing circuitry. If not, a connection operation 1008 connects sound input from the earcup microphones to the audio processing circuitry. Processing returns to the detection operation 1002.

An example audio device includes audio processing circuitry and one or more earcups, at least one of the earcups including a boom connector port. A connection detector connects to the boom connector port and is configured to detect a connection state at the boom connector port. One or more first microphones are positioned in the one or more earcups. A microphone switch controller is connected to the connection detector and is configured to connect the audio processing circuitry to one of the one or more first microphones or the boom connector port based on the detected connection state of the boom connector port.

Another example audio device of any preceding audio device further includes one or more second microphones supported by a boom having a boom connector jack that is compatible for electrical connection and removable attachment to the boom connector port. The microphone switch controller is configured to connect the one or more second microphones to the audio processing circuitry responsive to detection that the boom is attached to the boom connector port.

Another example audio device of any preceding audio device is provided, wherein one or more audio processing parameters of the audio processing circuitry are adjusted to the one or more first microphones or the one or more second microphones based on the detected connection state of the boom connector port.

Another example audio device of any preceding audio device is provided, wherein the microphone switch controller is configured to connect the one or more first microphones to the audio processing circuitry responsive to detection that a boom is not attached to the boom connector port.

Another example audio device of any preceding audio device is provided, wherein the detected connection state of the boom connector port is recorded as a connection parameter in the audio device by the connection detector.

Another example audio device of any preceding audio device is provided, wherein the detected connection state of the boom connector port is recorded as a connection parameter in the audio device that is readable by the microphone switch controller.

Another example audio device of any preceding audio device is provided, wherein the connection detector mechanically detects the connection state at the boom connector port.

Another example audio device of any preceding audio device is provided, wherein the connection detector electrically detects the connection state at the boom connector port.

Another example audio device of any preceding audio device is provided, wherein the connection detector magnetically detects the connection state at the boom connector port.

An example method includes detecting a connection state at a boom connector port of one or more earcups of an audio device, the one or more earcups including one or more first microphones and connecting audio processing circuitry of the audio devices to one of the one or more first microphones and the boom connector port based on the detected connection state of the boom connector port.

Another example method of any preceding method further includes providing one or more second microphones supported by a boom having a boom connector jack that is compatible for electrical connection and removable attachment to the boom connector port and connecting the one or more second microphones to the audio processing circuitry responsive to detection that the boom is attached to the boom connector port.

Another example method of any preceding method further includes adjusting one or more audio processing parameters of the audio processing circuitry to the one or more first microphones or the one or more second microphones based on the detected connection state of the boom connector port.

Another example method of any preceding method is provided, wherein the connecting operation includes connecting the one or more first microphones to the audio processing circuitry responsive to detection that a boom is not attached to the boom connector port.

Another example method of any preceding method is provided, wherein the detected connection state of the boom connector port is recorded as a connection parameter in the audio device.

Another example method of any preceding method is provided, wherein the connection detector mechanically detects the connection state at the boom connector port.

Another example method of any preceding method is provided, wherein the connection detector electrically detects the connection state at the boom connector port.

Another example method of any preceding method is provided, wherein the connection detector magnetically detects the connection state at the boom connector port.

Example wireless headphones include audio processing circuitry and one or more earcups, at least one of the earcups including a boom connector port. A connection detector is connected to the boom connector port and is configured to detect a connection state at the boom connector port. One or more first microphones are positioned in the one or more earcups. A microphone switch controller is connected to the connection detector and is configured to connect the audio processing circuitry to one of the one or more first microphones or the boom connector port based on the detected connection state of the boom connector port.

Other example wireless headphones of any previous headphones further include one or more second microphones supported by a boom having a boom connector jack that is compatible for electrical connection and removable attachment to the boom connector port, wherein the microphone switch controller is configured to connect the one or more second microphones to the audio processing circuitry responsive to detection that the boom is attached to the boom connector port.

Other example wireless headphones of any previous headphones are provided, wherein the microphone switch controller is configured to connect the one or more first microphones to the audio processing circuitry responsive to detection that a boom is not attached to the boom connector port.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software/firmware product or packaged into multiple software/firmware products.

What is claimed is:

1. An audio device comprising:
- one or more earcups, at least one of the earcups including a microphone connector port;
- a connection detector connected to the microphone connector port and configured to detect a connection state at the microphone connector port, the connection state comprising whether or not a microphone is connected to the microphone connector port;
- one or more first microphones positioned in the one or more earcups;
- audio processing circuitry; and
- a microphone switch controller connected to the connection detector and configured to connect the audio processing circuitry to one of the one or more first microphones or the microphone connector port based on the detected connection state of the microphone connector port
- wherein the microphone switch controller is configured to connect the one or more first microphones to the audio processing circuitry responsive to detection that nothing is attached to the microphone connector port.

2. The audio device of claim 1, further comprising:
- one or more second microphones that is compatible for electrical connection and removable attachment to the microphone connector port, wherein the microphone switch controller is further configured to connect the one or more second microphones to the audio processing circuitry responsive to detection that the one or more second microphones is attached to the microphone connector port.

3. The audio device of claim 2, wherein one or more audio processing parameters of the audio processing circuitry are adjusted to the one or more first microphones or the one or more second microphones based on the detected connection state of the microphone connector port.

4. The audio device of claim 1, wherein the detected connection state of the microphone connector port is recorded as a connection parameter in the audio device by the connection detector.

5. The audio device of claim 1, wherein the detected connection state of the microphone connector port is recorded as a connection parameter in the audio device that is readable by the microphone switch controller.

6. The audio device of claim 1, wherein the connection detector mechanically detects the connection state at the microphone connector port.

7. The audio device of claim 1, wherein the connection detector electrically detects the connection state at the microphone connector port.

8. The audio device of claim 1, wherein the connection detector magnetically detects the connection state at the microphone connector port.

9. The audio device of claim 1, wherein the audio device is wireless headphones.

10. A method comprising:
- detecting a connection state at a microphone connector port of one or more earcups of an audio device, the one or more earcups including one or more first microphones, the connection state comprising whether or not a microphone is connected to the microphone connector port;
- connecting audio processing circuitry of the audio devices to one of the one or more first microphones and the microphone connector port based on the detected connection state of the microphone connector port; and
- connecting the one or more first microphones to the audio processing circuitry responsive to detection that nothing is attached to the microphone connector port.

11. The method of claim 10, further comprising:
- providing one or more second microphones that is compatible for electrical connection and removable attachment to the microphone connector port; and
- connecting the one or more second microphones to the audio processing circuitry responsive to detection that the one or more second microphones is attached to the microphone connector port.

12. The method of claim 10, further comprising:

adjusting one or more audio processing parameters of the audio processing circuitry to the one or more first microphones or the one or more second microphones based on the detected connection state of the microphone connector port.

13. The method of claim 10, wherein the detected connection state of the microphone connector port is recorded as a connection parameter in the audio device.

14. The method of claim 10, wherein the connection detector mechanically detects the connection state at the microphone connector port.

15. The method of claim 10, wherein the connection detector electrically detects the connection state at the microphone connector port.

16. The method of claim 10, wherein the connection detector magnetically detects the connection state at the microphone connector port.

* * * * *